Patented Dec. 7, 1943

2,336,223

UNITED STATES PATENT OFFICE 2,336,223

ESTER OF ISOBUTANE-1,3-DI-OL AND METHOD OF MAKING SAME

Gerald H. Coleman, Bartholdt C. Hadler, and Garnett V. Moore, Midland, Mich., assignors to The Dow Chemical Company, Midland, Mich., a corporation of Michigan No Drawing. Application March 20, 1940, Serial No. 325,008

14 Claims. (Cl. 260—474)

This invention concerns certain new esters and a method of preparing them.

The new esters herein claimed are 3-chloro-isobutyl esters of organic carboxylic acids. They have the general formula:

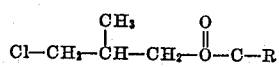

wherein R represents a hydrocarbon radical or a substituted hydrocarbon radical. They are in most instances substantially colorless, high boiling liquids. They are useful as organic solvents and as chemical agents from which a variety of other organic compounds, e. g. mixed di-esters of isobutane-1,3-di-ol with two different organic acids, may be prepared.

We have found that a chloro-isobutyl ester having the above general formula is formed, usually together with a corresponding di-ester of isobutane-1,3-di-ol, by heating a metal salt of an organic carboxylic acid and 1,3-dichloro-isobutane to a temperature at which they interact. The reactions which take place in this stage of the process are illustrated by the equations:

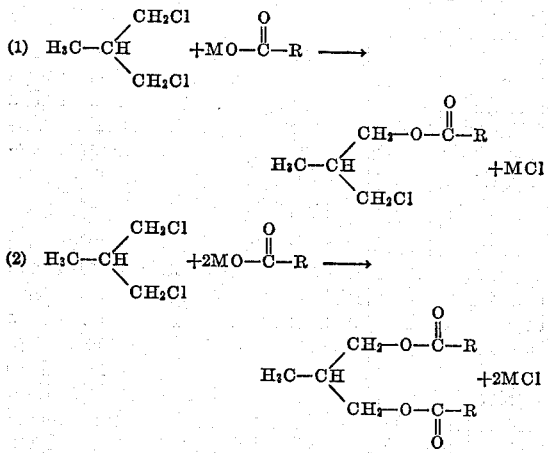

wherein R represents a hydrocarbon radical and M a metal. These two reactions appear to take place simultaneously even though the relative proportions of the two reactants be varied widely. Peculiarly, the yield of the diester (i. e. the organic product of Equation 2) increases and the yield of the 3-chloro-isobutyl ester becomes lower as the molecular ratio of the metal salt reactant to the 1,3-dichloro-isobutane reactant is reduced from 2 to 1.

We have further found that the di-ester, produced as in Equation 2, may be reacted with hydrogen chloride to form additional 3-chloro-isobutyl mono-ester, thus increasing the yield of the latter. This reaction is illustrated by the equation:

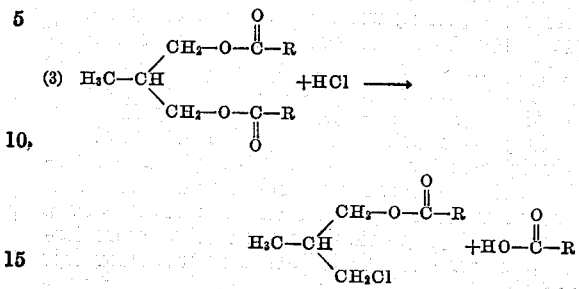

Although this reaction of hydrogen chloride with the di-ester to form the 3-chloro-isobutyl ester may be carried out rapidly, the 3-chloro-isobutyl ester product is relatively stable in the presence of hydrogen chloride and does not readily react with the latter. Accordingly, the di-ester formed by the initial step of reacting a salt of an organic acid with 1,3-dichloro-isobutane need not be isolated prior to reacting it with hydrogen chloride. Instead, the crude reaction mixture comprising the 3-chloro-isobutyl ester and the corresponding organic di-ester, which is formed in the first stage of the process, may be treated directly with hydrogen chloride to convert a considerable portion of the organic di-ester into the desired 3-chloro-isobutyl ester and thus increase the yield of the latter.

In preparing a 3-chloro-isobutyl ester of a carboxylic acid, a mixture of a metal salt of the acid and 1,3-dichloro-isobutane is heated to a reaction temperature, preferably with agitation, in a closed reactor. Examples of metal salts of carboxylic acids which may be used in the reaction are the sodium, potassium, calcium, and barium salts of acetic, propionic, butyric, valeric, caproic, crotonic, capric, undecylic, oleic, stearic, benzoic, cyclohexanoic, and cinnamic acids, etc. Alkali metal, e. g. sodium or potassium, salts of the organic acids are preferably used in the reaction.

The reactants may be used in any desired proportions, although the yield of the chloro-isobutyl ester is usually highest when the two reactants are used in approximately equimolecular proportions. However, for purpose of increasing the ease of stirring, we sometimes use a molecular excess of the dichloro-isobutane reactant, e. g. we use between 1.5 and 3 moles of 1,3-dichloro-isobutane per mole of the salt reactant. Other diluents or liquid reaction mediums such as benzene, kerosene, ligroin, or a liquid organic acid, e. g. acetic or propionic acid, corresponding to the salt reactant may be used. The rate of reaction may be increased somewhat by having present in the reaction mixture a small proportion of a catalyst of the type capable of promoting reaction between an alkali metal salt of an organic carboxylic acid and halo-aliphatic hydrocarbon, but the reaction may be carried out smoothly and at a satisfactory rate without use of such catalyst. Examples of catalysts which may be employed to promote the reaction are water; metallic copper; copper sulphate; copper acetate; and alkylamines, cycloalkyl amines and heterocyclic amines such as diethylamine, butylamine, cyclohexylamine, pyridine; etc. By using copper or a copper compound together with such amino compound as the catalyst, the reaction rate is increased markedly.

The reaction is preferably carried out in a bomb or autoclave at temperatures between about 170° and 225° C., but lower or higher reaction temperatures may sometimes be used. After completing the reaction, the reactor may, if desired, be cooled and opened and the reaction mixture be distilled to separate the ester products. When this is done, both a chloro-isobutyl ester of the carboxylic acid and a di-ester of the acid with isobutane-1,3-di-ol are usually obtained in substantial yield. If desired, the di-ester may then be re-heated in an autoclave with hydrogen chloride to convert a substantial proportion thereof to the chloro-isobutyl ester. The temperature required for this reaction is somewhat dependent upon the particular di-ester under treatment and the proportion of hydrogen chloride used, but is usually between about 100° and 200° C. After completing this reaction, the mixture may be distilled or otherwise treated to separate the chloro-isobutyl ester product.

However, when the chloro-isobutyl ester is desired as the major product, it is most convenient, after completing the initial reaction between 1,3-dichloro-isobutane and the carboxylic acid salt, merely to introduce hydrogen chloride to the reaction mixture and continue the heating, e. g. for between 0.5 and 2 hours. In practice hydrogen chloride gas is introduced into the reactor in amount corresponding to 0.5 or more of the chemical equivalent of the metal salt reactant initially employed, but the hydrogen chloride is effective in converting at least a portion of the di-ester product into a corresponding chloro-isobutyl ester regardless of the proportion in which it is used. After completing the treatment with hydrogen chloride, the reactor is cooled and opened. The ester products are separated from the mixture in any of the usual ways, e. g. by distillation.

The following examples illustrate certain ways in which the principle of the invention has been applied, but they are not to be construed as limiting its scope.

*Example 1*

A mixture of 3 gram mols of 1,3-dichloro-isobutane and 3 gram mols of sodium acetate was heated with agitation in a bomb at a temperature of 200° C. for 5 hours. The bomb was then cooled and the charge removed. It was found that 97 per cent of the sodium acetate had been consumed. The reacted mixture was washed with water, dried, and distilled. There were obtained 0.74 gram mol of 3-chloro-isobutyl acetate and 0.89 gram mol of 1,3-di-acetoxy-isobutane. 3-chloro-isobutyl acetate is a colorless liquid having a boiling point of 112°–118° C. at 100 mm. pressure and the specific gravity 1.074 at 25° C./25° C. It has the formula:

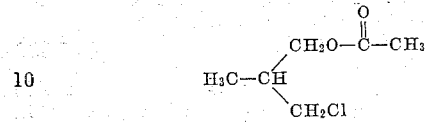

1,3-di-acetoxy-isobutane is a colorless liquid boiling at temperatures between 211° and 214° C. at 770 mm. pressure. It has the formula:

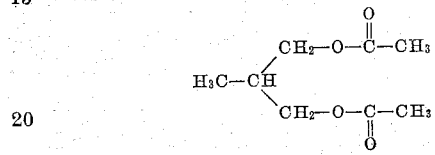

*Example 2*

A bomb was charged with 0.52 gram mol of 1,3-di-acetoxy isobutane, which has been prepared as in Example 1, and 0.49 gram mol of hydrogen chloride gas. The bomb was closed and heated, while rotating the same, at a temperature of 120°–125° C. for 1 hour. It was then cooled and the charge was removed, washed with water and distilled. There was obtained 0.372 gram mol of 3-chloro-isobutyl acetate and 0.121 gram mol of unreacted 1,3-di-acetoxy-isobutane.

*Example 3*

A mixture of equimolecular amounts of 1,3-dichloro-isobutane and sodium acetate to which approximately 0.4 per cent by weight of pyridine had been added was heated in a rotating copper bomb at a temperature of 175° C. for 15 hours. The bomb was then cooled and gaseous hydrogen chloride was introduced into the same in amount corresponding to approximately 0.27 of the molecular equivalent of the sodium acetate initially used. The bomb was then reheated to a temperature of 125° C. for 2 hours, after which it was cooled and the charge was removed. The mixture was washed with water, dried and fractionally distilled to separate the ester products. There were obtained approximately 14.8 mols of 3-chloro-isobutyl acetate per mol of the 1,3-di-acetoxy-isobutane product.

*Example 4*

A mixture of 5 gram mols of sodium propionate, 5 gram mols of 1,3-di-chloro-isobutane, and 0.05 gram mol of pyridine was heated in a rotating copper bomb at a temperature of 175° C. for 15 hours. The bomb was then cooled and the charge removed. The reacted mixture was distilled to separate the ester products. There were obtained 0.81 gram mol of 3-chloro-isobutyl propionate and 0.91 gram mol of 2-methyl-trimethylene glycol di-propionate. The 3-chloro-isobutyl propionate product was a colorless liquid boiling at temperatures between 130° and 133° C. at 100 mm. pressure, having the specific gravity of 1.048 at 25° C./25° C., and having the index of refraction $n^{25}_D = 1.433$. It has the formula:

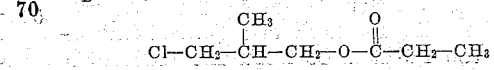

The 2-methyl-trimethylene glycol di-propionate is a colorless liquid boiling at 130°–131° C. at 20 mm. pressure, having the specific gravity of 1.003 at 25° C./25° C. and having the index of refraction $n^{25}_D=1.425$. Its formula is:

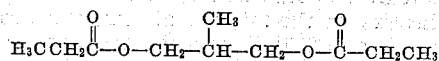

Example 5

A mixture of 5 gram mols of sodium butyrate, 5 gram mols of 1,3-dichloro-isobutane and 0.05 gram mol of pyridine was heated in a rotating copper bomb at a temperature of 175° C. for 15 hours. The bomb was then cooled and the charge removed. The reaction mixture was diluted with carbon tetrachloride, filtered, and the filtrate was distilled to separate the ester products. There were obtained 1.08 gram mols of 3-chloro-isobutyl butyrate and 0.79 gram mol of 2-methyl-1,3-trimethylene glycol dibutyrate. The 3-chloro-isobutyl butyrate product was a colorless liquid boiling at approximately 125°-127° C. at 50 mm. pressure, having a specific gravity of 1.023 at 25° C./25° C., and having the index of refraction $n^{25}_D=1.434$. It has the formula:

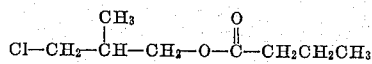

The 2-methyl-1,3-trimethylene glycol di-butyrate product was a colorless liquid boiling at 135°-136° C. under 10 mm. pressure, having the specific gravity of 0.9807 at 25° C./25° C. and having the index of refraction $n^{25}_D=1.439$. It has the formula:

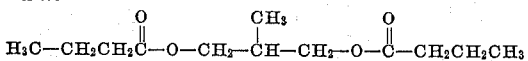

Example 6

A mixture of 2 gram mols of sodium crotonate, 2 gram mols of 1,3-dichloro-isobutane and approximately 0.03 gram mol of pyridine was heated in a rotating copper bomb at temperature 175° C. for 15 hours after which the bomb was cooled, the charge removed and the ester products were separated as in Example 5. There were obtained 0.537 gram mol of 3-chloro-isobutyl crotonate and 0.421 gram mol of 2-methyl-trimethylene glycol dicrotonate. The 3-chloro-isobutyl crotonate is a colorless liquid boiling at approximately 115°-118° C. at 20 mm. pressure and having the specific gravity of 1.057 at 25° C./25° C. Its formula is:

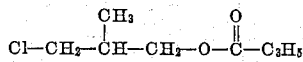

The 2-methyl trimethylene glycol dicrotonate is a colorless liquid boiling at 115°-119° C. under 3 mm. pressure and having the specific gravity of 1.031 at 25° C./25° C. Its formula is:

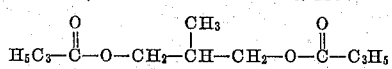

Example 7

A mixture of 3.18 gram mols of sodium benzoate, 5.5 gram mols of 1,3-dichloro-isobutane and approximately 0.05 gram mol of pyridine was heated in a rotating copper bomb at 175° C. for 15 hours. The bomb was then cooled and the charge removed. The reaction mixture was distilled whereby there was obtained 0.602 gram mol of 3-chloro-isobutyl benzoate, a colorless liquid boiling at approximately 148°-150° C. under 10 mm. pressure, having the specific gravity 1.142 at 25° C./25° C., and having the formula:

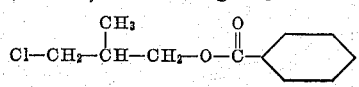

Example 8

A mixture of 2.5 gram mols of sodium salicylate, 5 gram mols of 1,3-dichloro-isobutane and approximately 0.05 gram mol of pyridine was heated at a temperature of 175° C. in a rotating copper bomb for 15 hours after which the bomb was cooled and the charge removed. The reaction mixture was distilled whereby there was obtained 0.832 gram mol of 3-chloro-isobutyl salicylate, a colorless liquid boiling at approximately 131°-132° C. under 3 mm. pressure and having the specific gravity of 1.202 at 25°/25° C. The product has the formula:

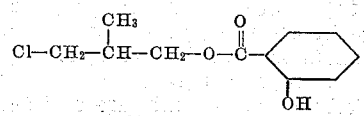

Example 9

A mixture of 0.74 gram mol of sodium cinnamate, 0.74 gram mol of 1,3-dichloro-isobutane and approximately 0.01 gram mol of pyridine was heated in a rotating copper bomb at a temperature of 175° C. for 15 hours. The bomb was then cooled and the charge removed. The reaction mixture was distilled, whereby there was obtained 0.215 gram mol of 3-chloro-isobutyl cinnamate, a colorless liquid distilling at approximately 147°-148° C. under 1 mm. pressure and having a specific gravity of 1.125 at 25° C./25° C. The formula for the product is:

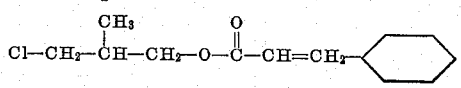

By procedure similar to that illustrated in the foregoing examples we have also reacted 1,3-dichloro-isobutane with sodium oleate and obtained 3-chloro-isobutyl oleate which is a viscous, high boiling liquid.

Other modes of applying the principle of the invention may be employed instead of those explained, change being made as regards the method or compounds herein disclosed provided the steps or compounds set forth by any of the following claims or the equivalent of such stated steps or compounds be employed.

We therefore particularly point out and distinctly claim as our invention:

1. A 3-chloro-isobutyl ester of an organic carboxylic acid.

2. A 3-chloro-isobutyl ester having the general formula:

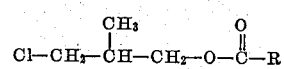

wherein R represents an aromatic radical.

3. A 3-chloro-isobutyl ester of an aliphatic carboxylic acid.

4. 3-chloro-isobutyl acetate.

5. 3-chloro-isobutyl propionate.

6. 3-chloro-isobutyl salicylate.

7. The method of making a 3-chloro-isobutyl ester of a carboxylic acid which comprises reacting a metal salt of an organic carboxylic acid with 1,3-dichloro-isobutane.

8. In a method of making a 3-chloro-isobutyl ester of an organic carboxylic acid, the step of reacting an alkali metal salt of an organic carboxylic acid with 1,3-dichloro-isobutane.

9. In a method of making a 3-chloro-isobutyl ester of an organic carboxylic acid, the step of reacting an alkali metal salt of an organic carboxylic acid with 1,3-dichloro-isobutane in the presence of a catalyst.

10. In a method of making a 3-chloro-isobutyl ester of an organic carboxylic acid, the step of heating a substantially anhydrous mixture of 1,3-dichloro-isobutane and an alkali metal salt of an organic carboxylic acid at super-atmospheric pressure to a reaction temperature between about 170° and about 225° C.

11. The method which comprises heating a substantially anhydrous mixture of 1,3-dichloro-isobutane and an alkali metal salt of an organic carboxylic acid at super-atmospheric pressure to a reaction temperature between about 170° and about 225° C. and thereafter adding hydrogen chloride to the mixture and heating the mixture at super-atmospheric pressure to a temperature between about 100° and about 200° C.

12. The method which comprises heating a substantially anhydrous mixture of 1,3-dichloro-isobutane and an alkali metal salt of carboxylic acid at super-atmospheric pressure to a reaction temperature between about 170° and about 225° C., thereafter adding hydrogen chloride, continuing heating of the mixture at temperatures between 100° and 200° C., and separating a 3-chloro-isobutyl ester of the carboxylic acid from the reacted mixture.

13. In a method of making a 3-chloro-isobutyl ester of an organic carboxylic acid, the step of reacting hydrogen chloride with a corresponding di-ester of isobutane-1,3-di-ol.

14. The method which comprises heating an organic carboxylic acid di-ester of isobutane-1,3-di-ol with hydrogen chloride to a reaction temperature between 100° and 200° C. under substantially anhydrous conditions and thereafter separating a 3-chloro-isobutyl ester of the carboxylic acid from the reacted mixture.

GERALD H. COLEMAN.
BARTHOLDT C. HADLER.
GARNETT V. MOORE.